United States Patent [19]

Kashiwagi

[11] Patent Number: 5,146,247
[45] Date of Patent: Sep. 8, 1992

[54] INFORMATION RETRIEVAL APPARATUS

[75] Inventor: Kazuo Kashiwagi, Tokyo, Japan

[73] Assignee: Canon Kabushiki Kaisha, Tokyo, Japan

[21] Appl. No.: 288,142

[22] Filed: Dec. 22, 1988

[30] Foreign Application Priority Data

Dec. 26, 1987 [JP] Japan .................................. 62-331551
Dec. 26, 1987 [JP] Japan .................................. 62-331552

[51] Int. Cl.$^5$ ............................................. G03B 23/08
[52] U.S. Cl. .................................... 353/26 A; 353/25
[58] Field of Search .................... 353/25, 26 R, 26 A, 353/27 A; 250/570, 557, 561, 548; 377/18

[56] References Cited

U.S. PATENT DOCUMENTS

| | | | |
|---|---|---|---|
| 3,958,874 | 5/1976 | Uchida et al. | 353/26 A |
| 3,999,846 | 12/1976 | Sone et al. | 250/570 |
| 4,016,406 | 4/1977 | Abe et al. | 353/26 A |
| 4,436,391 | 3/1984 | Kashiwagi | 353/26 R |
| 4,600,841 | 7/1986 | Toruno et al. | 250/557 |
| 4,665,318 | 5/1987 | Toda et al. | 250/570 |

Primary Examiner—William A. Cuchlinski, Jr.
Assistant Examiner—William C. Dowling
Attorney, Agent, or Firm—Fitzpatrick, Cella, Harper & Scinto

[57] ABSTRACT

An information retrieval apparatus for retrieving desired information in an information recording medium by driving the information recording medium and detecting a mark put on the driven information recording medium has a drive controller for controlling the drive of the information recording medium in accordance with measurement of an interval of marks of the information recording medium measured at the start of retrieval of the information recording medium.

17 Claims, 5 Drawing Sheets

| MARK INTERVAL L | FILM DRIVE SPEED S | NUMBER OF FRAMES $a$ | NUMBER OF FRAMES $b$ |
|---|---|---|---|
| $\ell_1 \sim \ell_2(>\ell_1)$ | $S_1$ | $a_1$ | $b_1$ |
| $\ell_3(>\ell_2) \sim \ell_4(>\ell_3)$ | $S_2\ (>S_1)$ | $a_2\ (<a_1)$ | $b_2(<b_1)$ |
| $\ell_5(>\ell_4) \sim \ell_5(>\ell_4)$ | $S_3\ (>S_2)$ | $a_3(<a_2)$ | $b_3(<b_2)$ |

FIG. 12

INFORMATION RETRIEVAL APPARATUS

BACKGROUND OF THE INVENTION

1. Field of the Invention

The present invention relates to an information retrieval apparatus for automatically retrieving desired information in a recording medium such as a film by detecting a mark on the information recording medium, suitable for use in a microfilm reader or film reader/printer.

2. Related Background Art

In a conventional retrieval apparatus used in a film reader, a retrieval mark put on a side of each frame of a film is optically detected and counted so that a desired frame in the film is automatically retrieved.

In such a retrieval apparatus, the marks on the film are illuminated by a lamp, a change of light interrupted by the marks when the film is driven is detected by a mark sensor, an output signal of the mark sensor is counted by a counter, the count of the counter is compared with a frame number of a desired frame entered by a keyboard by a comparator, and when they are equal, a stop signal is generated by the comparator to a drive control circuit to stop a drive system which drives the film so that the desired frame is stopped at a predetermined projection position on a screen.

Figure 6:
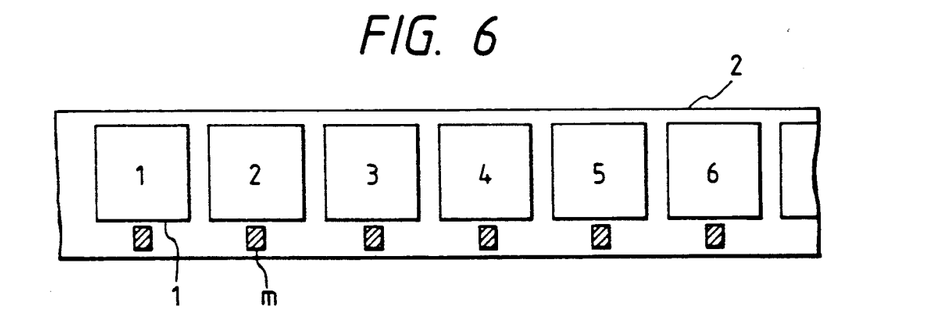
FIGS. 6 and 7 show front views of microfilms.
Figure 7:
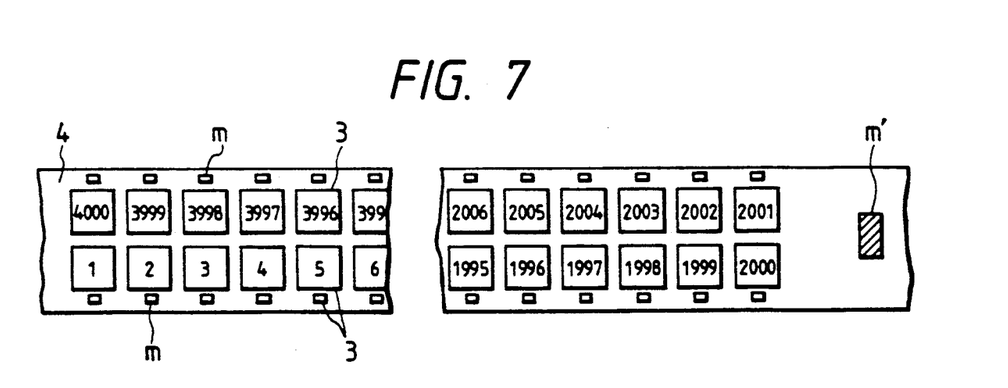

The film used in a projection device such as film reader or film reader printer may be a film 2 having a line of recorded images 1 as shown in FIG. 6 or a film 4 having two lines of recorded images 3 as shown in FIG. 7, where m denotes a retrieval mark put on a side of each image. The film 4 is called a duo film which is prepared by photographing images on one side of the film sequentially from a leading end of the film, and when one side has been photographed, reverse-loading the film and photographing images on the remaining side of the film sequentially from a trailing end of the film. It is thus prepared in a reciprocal photographing manner. In FIG. 6, the left side in the leading end of the film and the right side is the trailing end of the film. The images in the film 4 have been photographed in the sequence of numbers put on the images (which are actually not recorded but shown for a sake of convenience of explanation). A retrieval mark m is recorded on a side of the film for each image frame in order to allow retrieval of the image. In the duo film, an interval of the retrieval marks is small because a photographing reduction ratio is large while the interval of marks in the conventional film shown in FIG. 6 is relatively large.

Figure 12:
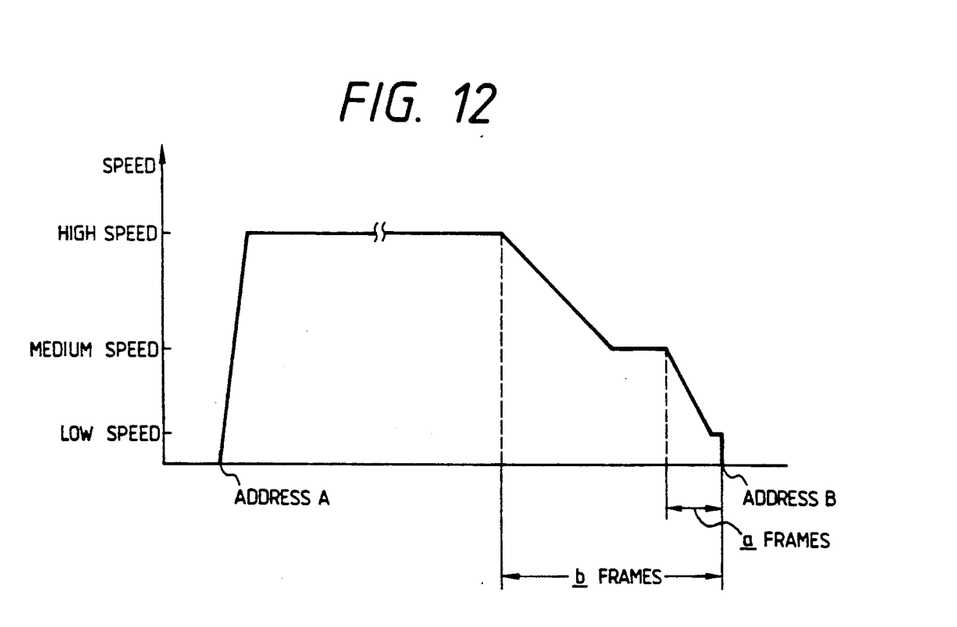
FIG. 12 illustrates a film stop sequence.

In the prior art, when an address B is to be retrived starting from a current address A as shown in FIG. 12, the film is first moved at a high speed, the speed is reduced to a medium speed b frames before the desired address, the speed is further reduced to a low speed a frames before the desired address, and the film is stopped at the desired address B. The number of frames at which the speed is to be changed is determined by a braking performance of a film drive unit. There are various mark intervals of the film as described above. In the prior art, the stop sequence for the film is determined in accordance with a shortest mark interval so that the desired frame does not run over the predetermined stop position. As a result, if a film having a long mark interval is used, the speed is changed for before the desired frame and hence a retrieval time required to position the desired frame at the predetermined position is long.

Figure 2:
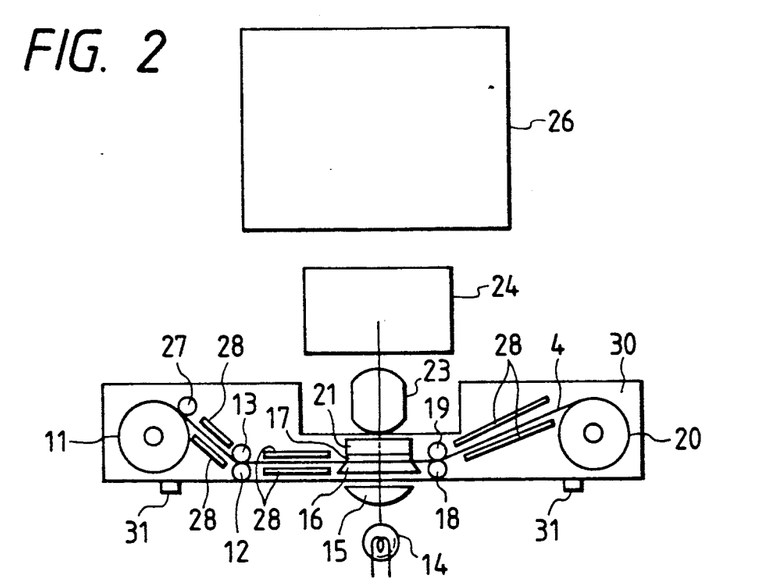
FIG. 2 shows a construction of the embodiment of the retrieval apparatus of the present invention.

In the prior art, an upper limit of the film drive velocity in the information retrieval apparatus is determined by a speed to detect and process the retrieval marks. If the film drive speed is determined based on the duo film having a small mark interval and the information is retrieved from a film having a long retrieval mark interval as shown in FIG. 2, the retrieval speed is low because the film is driven at the speed designed for the duo film in spite of the fact that a faster drive speed may be used.

SUMMARY OF THE INVENTION

It is an object of the present invention to provide an information retrieval apparatus capable of positioning desired information at a predetermined position in a minimum time determined by a mark interval for each information recording medium.

In accordance with the present invention, the information retrieval apparatus for retrieving desired information in an information recording medium by moving the information recording medium and detecting a mark put on the driven information recording medium has drive control means for controlling a drive speed of the information recording medium in accordance with measurement of an interval of marks on the information recording medium measured at the start of retrieval of the information recording medium.

The information retrieval apparatus of the present invention further has speed change means for changing a speed change timing of the information recording medium in accordance with the measurement of the interval of marks of the information recording medium measured at the start of retrieval of the information recording medium.

DETAILED DESCRIPTION OF THE PREFERRED EMBODIMENTS

Figure 3:
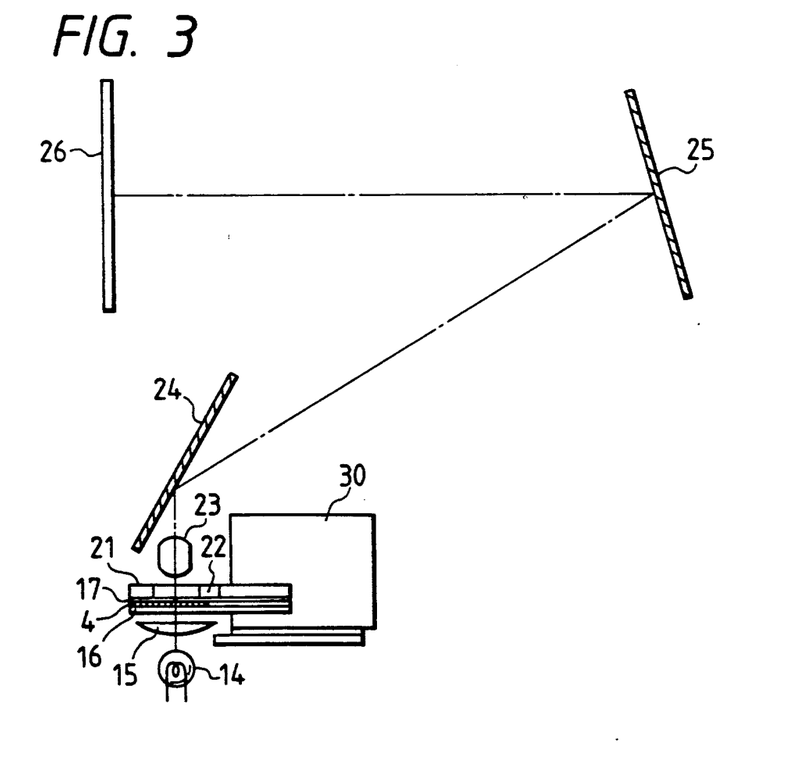
FIG. 3 shows a sectional view of a microfilm reader which uses the retrieval apparatus of FIG. 1.

The preferred embodiments of the present invention are now explained with reference to the drawings. FIGS. 2 and 3 show microfilm readers to which the information retrieval apparatus of the present invention is applied. Numeral 11 denotes a supply reel, numerals 12 and 13 denote guide rollers, numeral 14 denotes a lamp for illuminating a microfilm 4 supplied from the supply reel 11, numeral 15 denotes a condenser lens, numerals 16 and 17 denote transparent glass plates facing each other on the opposite sides of a film transport path, numeral 18 denotes a capstan roller, numeral 19 denotes a pinch roller, and a numeral 20 denotes a take-up auto-reel. The supply reel 11 and the take-up auto-reel 20 are connected to film tension/take-up motors (not shown), respectively, and the capstan roller 18 is connected to a film supply motor (having a larger torque than the film tension/ take-up motor).

The microfilm 4 as an information recording medium is a duo film shown in FIG. 7, which is spanned between the supply reel 11 and the take-up auto-reel 20 and taken up to the take-up reel or rewound to the supply reel through a predetermined path as the capstan roller 18 is rotated forwardly or reversely.

Numerals 21 and 22 denote mark detectors, numeral 23 denotes a projection lens, numeral 24 denotes a first reflection mirror, numeral 25 denotes a second reflection mirror, and numeral 26 denotes a screen. The projection lens 23, mirrors 24 and 25 and screen 26 are arranged at predetermined positions. The microfilm 4 is illuminated by the lamp 14. A light transmitted through the microfilm 4 passes through the lens 23, is reflected by the reflection mirrors 24 and 25 and directed to the screen 26 so that an image of the illuminated film is projected on the screen in a magnified scale. Numeral 30 denotes a film holding table which holds the supply reel 11, guide rollers 12 and 13, glass plates 16 and 17, capstan roller 18, pinch roller 19, take-up auto-reel 20 and mark detectors 21 and 22.

On the other hand, numeral 27 denotes an initial load capstan. When an auto-load switch is first depressed, an initial motor (not shown) is driven to take out a leading end of the film wound on the supply reel 11, and the film is fed to the capstan roller 18 along a guide 28. As the capstan roller 18 is driven, the film is advanced and wound around the take-up auto-reel 20.

The first mark detector 21 detects marks m arranged on a side of a first line of images on the microfilm 4, and the second mark detector 22 detects marks m arranged on a side of a second line of images. The mark detectors 21 and 22 have their photo-electric converters which are conventional ones to produce high level mark sense signals when they receive light signals from the marks.

Figure 1:
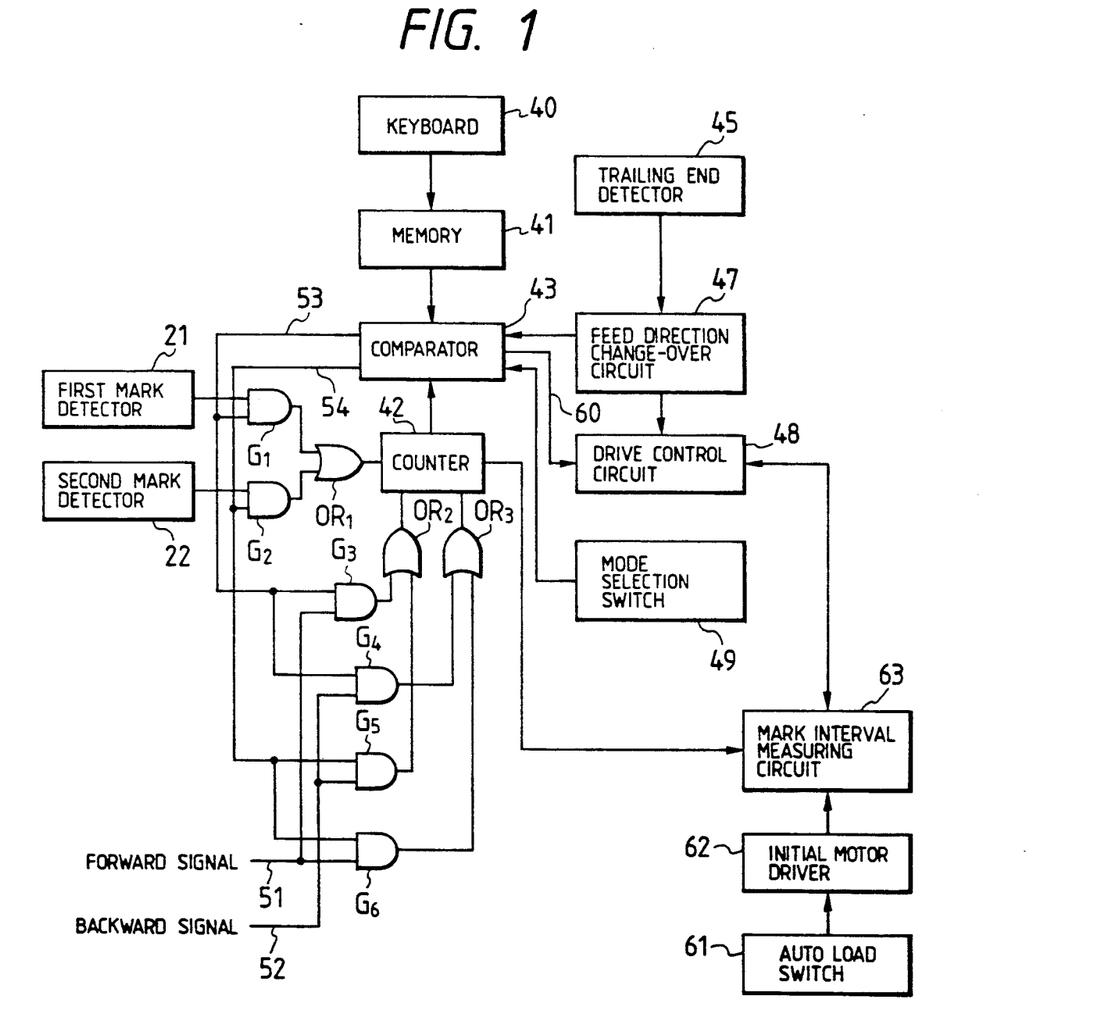
FIG. 1 shows a block diagram of one embodiment of a retrieval apparatus of the present invention.

FIG. 1 shows a retrieval apparatus applied to the above reader. Numeral 40 denotes a keyboard for entering a search number (frame number) of a desired image, numeral 41 denotes a memory for storing the search number entered by the keyboard, and numeral 42 denotes an up/down counter which is count means for counting up or down mark sense signals produced by the first mark detector 21 and the second mark detector 22. The counter 42 counts up the mark sense signal in a count-up mode, and counts down the mark sense signal in a count-down mode. Numeral 43 denotes a comparator which compares the count A of the counter 42 and the count B of the counter 41 to calculate $A - B = C$ and produces a signal indicating a film feed direction in accordance with a polarity of the difference C, when C is equal to a predetermined value b (variable), it sends a signal to a drive control circuit which is sequence change means to change the speed from a high speed to a medium speed. When C is equal to a predetermined value a (variable), it sends a signal to the drive control circuit 48 to change the speed from the medium speed to a low speed. When both counts are equal, namely, when the count A of the counter 42 is equal to the search number B stored in the memory 41 ($A - B = C = 0$), it produces a film stop signal. Numeral 49 denotes a manually operated mode selection switch. A mode is set in accordance with the type of mark of the film used. When the film 2 of FIG. 6 is used, a mode A is set, and when the film 4 of FIG. 7 is set, a mode B is set. When the mode A is selected, the comparator 43 produces a low level signal from an output terminal 54 and a high level signal from an output terminal 53, and when the mode B is selected, a high level signal is produced selectively from the output terminals 53 and 54.

Numeral 45 denotes a trailing end detector which detects when the last image on the microfilm 4 (image numbers 2000 and 2001 in FIG. 7) has passed through the mark sense position and fed to the take-up reel 20.

Figure 4:
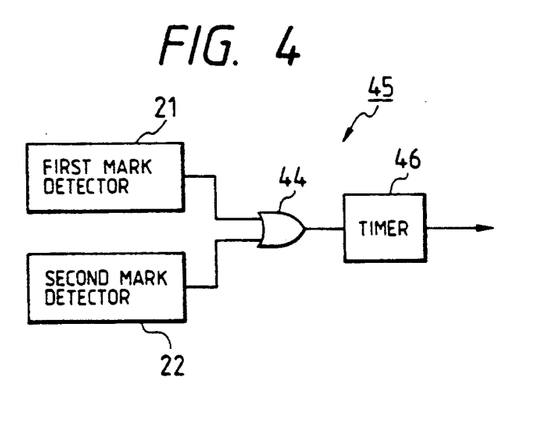
FIG. 4 shows an embodiment of a trailing end detector.

FIG. 4 shows an example of the trailing end detector 45. The interval of marks m put for the respective frames of the microfilm 4 is constant and the mark sense signal which is produced when the mark is detected is generated at a constant time interval. A timer 46 times out at a longer time interval than the time interval of mark sense signal when the film is driven at a predetermined speed. The timer 46 is reset while the mark detector 21 or 22 produces the mark sense signal at the desired interval during the feed of the film, and if the mark detector does not produce the mark sense signal by the time-out of the timer 46, the timer 46 produces a high level trailing edge detection signal. The timer may be a conventional one. Numeral 44 denotes an OR gate.

In FIG. 1, numeral 61 denotes an auto-load switch. At the start of the apparatus, an initial motor driver 62 is activated and the initial load capstan 27 is driven to span the film from the supply reel 11 to the take-up auto-reel 20. When the film reaches the capstan roller 18, it is wrapped around the take-up auto-reel 20 by the capstan roller 18. The capstan roller 18 is rotated at a constant rotation speed $\eta_0$ for a predetermined period, and a circumferential velocity is given by $\pi D \cdot \eta_0 / 60$ where D is a diameter of the capstan roller 18. The circumferential velocity v is pre-stored in a mark interval measuring circuit 63.

Figure 8:
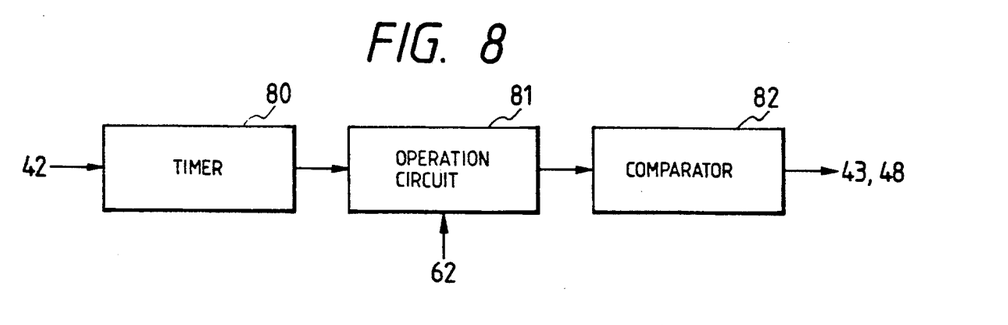
FIGS. 8 and 9 show block diagrams of a mark interval measurement circuit.

FIG. 8 shows an embodiment of the mark interval measuring circuit 63. A timer 80 is activated by a signal produced by the counter 42 when the counter 42 counts the mark sense signal, and the timer 80 is reset by a signal produced by the counter 42 when the counter 42 counts the next mark sense signal. A time interval t measured by the timer 80, that is, a time interval from the first mark sense to the next mark sense is supplied to an operation circuit 81, in which the circumferential velocity v has been pre-stored. When the time interval t is supplied from the timer 80, the operation circuit calculates $L = v \cdot t$. The result L represents a mark interval. The calculated mark interval L is supplied to a comparator 82 which compares it with a reference interval L'. Depending on the comparison result, a maximum drive speed S of the film to be searched and the numbers of frames a and b for changing the speed are determined. The numbers of frames a and b are set small when the measured mark interval L is longer than the reference interval L', and they are set large when L is shorter than L'. In other words, the distance from the desired address to the speed change point may be generally constant without regard to the mark interval.

The maximum film drive speed S is set relatively high when the mark interval L is longer than the reference interval L', and it is set relatively low when L is shorter than L'. When the measurement of the mark interval is over and the numbers of frames a and b for the speed change and the maximum speed S are set, the film is driven at the maximum speed by the capstan roller 18.

The drive control circuit 48 controls the film drive motor which drives the capstan roller. It changes the speed from a high speed to a medium speed, thence to a low speed in accordance with the comparison result produced at the output terminal 60 of the comparator 43. When it receives a film stop signal, it stops the motor, and when it receives a backward signal from a drive direction change-over circuit 47, it stops the motor and drives it in the backward direction with the same speed change as that in the forward drive.

The drive control circuit 48 drives the motor such that it drives the motor at a first high speed when the mark interval is relatively short, and drives the motor at a second high speed which is higher than the first high speed when the mark interval is relatively long.

A brake device (not shown) is activated by the film stop signal produced by the comparator 43 to prevent the rotation of the capstan roller 18. Numeral 47 denotes the drive direction change-over circuit which produces the backward signal when it receives the trailing end detection signal from the trailing end detector 45.

On the other hand, $G_1, G_2, \ldots G_6$ denote AND gates, and $OR_1, OR_2$ and $OR_3$ denote OR gates.

The AND gates $G_1$ and $G_2$ are opened and closed in response to the output signals at the output terminals 53 and 54 of the comparator 43, and selectively sends the outputs of the mark detectors 21 and 22 to the counter 42.

The AND gates $G_3$–$G_6$ produce signals to control the up/down counting of the counter 42.

Signals indicating the directions of film drive are supplied to signal lines 51 and 52. When the film 4 is driven in the direction to be taken up by the take-up auto-reel 20 (hereinafter forward direction), a high level forward signal is supplied to the signal line 51, and when the microfilm 4 is driven in the direction to be rewound on the supply reel 11 (hereinafter backward direction), a high level backward signal is supplied to the signal line 52. The forward and backward signal are produced by the drive signal generated by the comparator 43 or by detecting the direction of rotation of the motor which drives the capstan roller 18.

The AND gate $G_3$ is opened when it receives the high level signal from the output terminal 53 of the comparator 43 and the forward signal from the signal line 51, to produce a count-up signal The AND gate $G_4$ is opened when it receives the high level signal from the output terminal 53 of the comparator 43 and the backward signal from the signal line 52, to produce a count-down signal. The AND gate $G_5$ produces the count-up signal when it receives the high level signal from the output terminal 54 of the comparator 43 and the backward signal, and the AND gate $G_6$ produces the count-down signal when it receives the high level signal from the output terminal 54 of the comparator 43 and the forward signal The counter 42 is switched to the count-up mode by the count-up signal, and to the count-down mode by the count-down signal. The counter 42 is in the count-up mode if the microfilm is driven forward when the first line of images of the microfilm are searched, and it is in the count-down mode if the microfilm is driven backward When the second line of images of the microfilm are searched, the counter 42 is in the count-up mode if the microfilm is driven backward, and it is in the count-down mode if the microfilm is driven forward.

The operation of the apparatus is now explained. Where the film 2 shown in FIG. 6 is used, the mode selection switch 49 is set in the mode A. The output terminal 53 of the comparator 43 is at the high level and the output terminal 54 is at the low level. Under this condition, only the mark detection signal produced by the first mark detector 21 is sent to the counter through the AND gate $G1_1$. When the auto-load switch 61 is depressed, the initial motor driver 62 is activated to drive the initial motor (not shown) so that the initial load capstan 27 is rotated to take up the film 4 from the supply reel 11. When the film fed along the guide 28 reaches the capstan roller 18, it is continuously driven by the capstan roller 18 at a constant speed and wrapped around the take-up auto-reel 2. The initial motor is stopped when the film is coupled to the capstan roller 18. The film is fed at the same speed after it has been wrapped around. When the first mark m on the film passes through the first mark detector 21 and the signal from the first mark detector 21 is sent to the counter 42, the signal is sent to the mark interval measuring circuit 63. When the mark detection signal is supplied to the mark interval measuring circuit 63, it calculates the mark interval L based on the velocity information v of the capstan roller 18 from the drive control circuit and the time information t from the mark interval measuring circuit. Based on the calculated mark interval L, the drive speed in the high speed mode is set and the numbers of frames a and b for the speed change are set to a' and b', respectively. When the mark interval is relatively long, the drive speed in the high speed mode is set high, and when the mark interval is relatively short, the drive speed in the high speed mode is set lower. The actual settings differ depending on the control system. For the present film, a relatively high second speed is set.

When the mark interval is relatively long, the numbers of frames a and b are set small, and when the mark interval is relatively short, a and b are set large. The actual settings differ depending on the control system.

After two marks from the leading end of the film have been detected, the film is stopped, and then the backward signal is generated and the film is fed to the first frame, and it is stopped there. That is, the film is stopped when the first leading mark is detected. In the mode A, a search number V ($>1$) of a desired image of the microfilm 2 is entered by the keyboard 40. Since $1-B=C<0$, the comparator 43 produces the forward signal and the film drive motor is driven by the drive control circuit 48 so that the microfilm 4 is driven in the take-up direction of the take-up auto-reel 20 at the second drive speed. During the drive of the film, the AND gate $G_3$ is open and the counter 42 is in the count-up mode, and the AND gate $G_1$ is open so that the mark detection signal produced by the first mark detector 21 is counted up by the counter 42 When the difference between the count of the counter 42 and the search number stored in the memory 41 reaches the preset valve b', the comparator 43 sends a speed change signal to the drive control circuit 48 so that the speed is changed from the high speed to the medium speed. Then, when the difference between the count of the counter 42 and the search number stored in the memory 41 reaches the preset valve a', the speed is changed from the medium speed to the low speed. When the count of the counter 42 reaches the search number stored in the memory 41, the comparator 43 sends a film stop signal. The film drive motor is stopped by the film stop signal, and the film is stopped and the desired image is set at the imaging position. Thus, the image is projected on the screen 26 and the retrieval operation is terminated.

When the duo film 4 shown in FIG. 7 is used, the mode selection switch 49 is set to the mode B. The output terminal 53 of the comparator 43 is at the high level and the output terminal 54 is at the low level.

The auto-loading is effected in the same manner as that of the previous embodiment and the mark interval is measured. Since the mark interval is short in this case, the drive speed in the high speed mode is set to the relatively low first speed, and a and b are set to relatively large values a" and b", and the first frame is projected.

In the mode B, when a search number $B'(>1)$ of a desired image in the second line of the microfilm 4 is entered by the keyboard 40, the comparator 43 produces the forward signal because $1-B'=C<0$ and the film drive motor is driven through the drive control circuit 48 so that the microfilm 4 is taken up on the take-up reel at the first drive speed. During the feed of the film, the AND gate $G_3$ is open so that the counter 42 is set to the count-up mode, and the AND gate $G_1$ is open so that the mark detection signal produced by the first mark detector 21 is counted up by the counter 42. When the last image in the first line of the film (image number 2000 in FIG. 7) passes through the detection position of the mark detector 21, the trailing end detector 45 produces the trailing end detection signal, and the film drive motor is stopped and the film is stopped. Then, the drive direction change-over circuit 47 produces a reversal signal so that the film drive motor is reversed through the drive control circuit 48 and the microfilm 4 is driven in the backward direction. The same signal is sent to the comparator 43 from the drive direction change-over circuit 47 so that the output terminal 53 assumes the low level and the output terminal 54 assumes the high level.

During the feed of the film, the AND gate $G_5$ is opened so that the counter 42 is set to the count-up mode, and the AND gate $G_2$ is opened so that the mark detection signal produced by the second mark detector 22 is counted up by the counter 42. During the backward feed, when the difference between the count of the counter 42 and the search number stored in the memory 41 reaches b", the drive speed is changed from the high speed to the medium speed as is done for the film 2. Similarly, when the difference reaches a", the speed is changed from the medium speed to the low speed. When the count of the counter 42 reaches the search number stored in the memory 41, the comparator 43 produces a stop signal. Thus, the film drive motor is stopped and the film is stopped, and the desired image is positioned at the projection position and projected on the screen. Thus, the retrieval operation is terminated.

If a search number of a desired image in the first line is then entered by the keyboard to start the retrieval, the microfilm is driven forward, and when the trailing end detector 45 detects the trailing end, the film is stopped and then driven backward. The speed is changed from the high speed to the medium speed and the low speeds at the predetermined positions, and when the first mark detector 21 detects the search mark corresponding to the desired image, the comparator 43 produces the stop signal so that the film is stopped and the desired image is retrieved.

The film drive speed in the high speed mode is set to a maximum speed which permits the mark detection and the calculation, for each mark interval depending on the mark interval of the film used.

Figure 5:
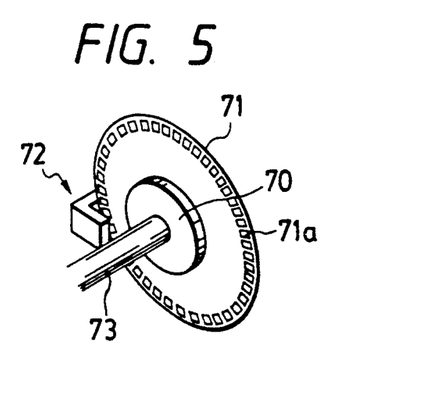
FIG. 5 shows a perspective view of an encoder used in other embodiment of the retrieval apparatus of the present invention.

FIG. 5 shows another embodiment of the present invention. The like elements to those shown in the previous embodiment are designated by the like numerals. In the previous embodiment, the mark interval is measured based on the capstan drive speed and the mark interval time measurement. In the present embodiment, a rotary encoder disk 71 having a number of rectangular holes 71a is attached to a rear end of a shaft 73 of a capstan roller 18 through a flange 70, and an encoder pulse signal which is generated each time the rectangular hole 71a passes through a photointerrupter 72 is counted. In this manner, the frame interval is measured without measuring the time.

Figure 9:
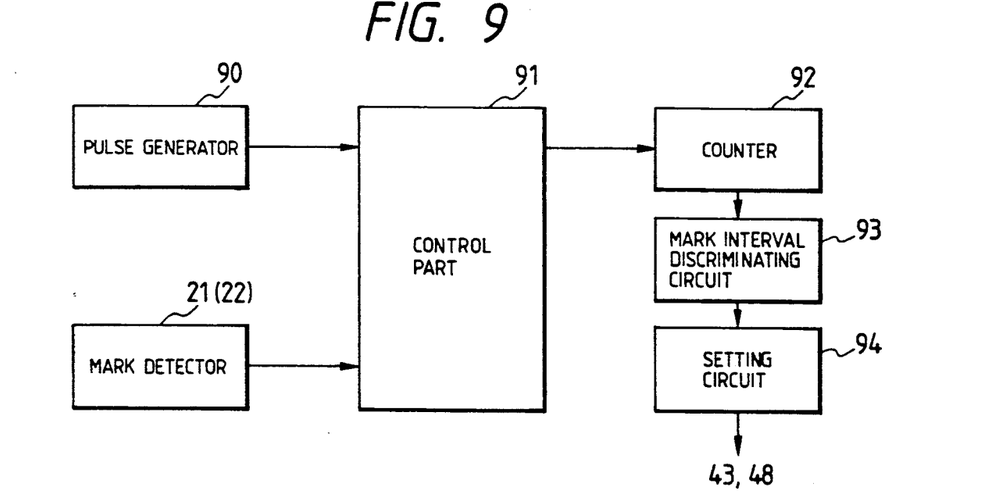

FIG. 9 shows a mark interval measuring circuit which uses the encoder pulse signal. Numeral 90 denotes a pulse generator for generating the encoder pulse signal, and numeral 91 denotes a controller having a gate circuit for sending to a counter 92 pulse signals produced by the pulse generator 90 during a time period from a time point when the mark detector 21 or 22 does no longer detect the first mark to a time point when it detects the next mark. The counter 92 thus has a count indicative of the mark interval. The count of the counter 92 is sent to a mark interval discriminator 93 which discriminates the mark interval L. Based on the discriminated mark interval, a maximum drive speed S and numbers of frames a and b for the speed change are determined.

In the present embodiment, the measurement is not affected by the film drive speed.

In the measuring method which uses the encoder, the encoder may be attached to the guide roller in the film path instead of the capstan.

In the present embodiment, the interval between two adjacent marks is measured. Alternatively, a time period or a film drive distance for the detection of a predetermined number (N) of marks after the detection of the first mark may be measured, and the measurement is divided by (N−1) to calculate a mean mark interval and the drive of the film is controlled based on the mean mark interval.

In the above embodiments, the speed is changed in three steps, high speed, medium speed and low speed, although it may be changed in two steps or four or more steps.

The recording medium is not limited to the film but it may be any web having marks thereon. The trailing end detector is not limited to the illustrated one but any other known method may be used. For example, as shown in FIG. 7, a special mark m' which is different in shape from the retrieval marks m may be put at the trailing end of the microfilm 4, and when the mark m' is detected by the detector, the trailing end of the film may be detected. Since the trailing end of the microfilm is usually fixed to the core of the reel, the film is tensioned when the microfilm has been fed to the end. Accordingly, the trailing end may be detected by detecting the change in tension of the film.

In the above embodiments, the mark interval is automatically detected. Alternatively, a user may set the mark interval. A reduction ratio and a size factor such as full size or half size may be keyed in and the mark interval may be determined based on those input data.

Figure 10:
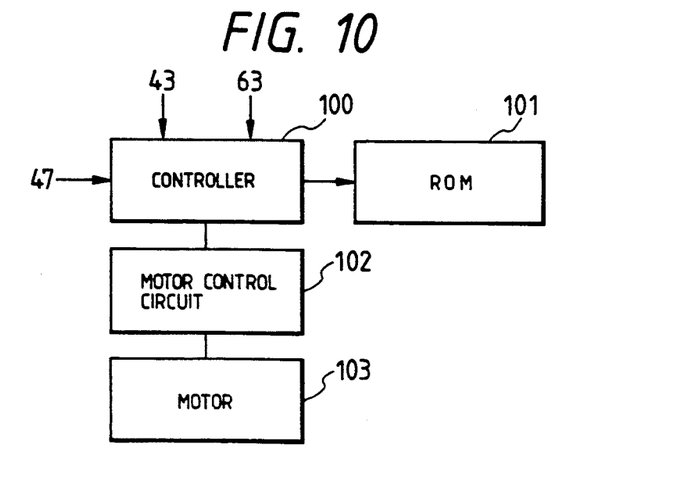
FIG. 10 shows a block diagram of a drive control circuit.

FIG. 10 shows an embodiment of the drive control circuit. Numeral 100 denotes a controller having a microprocessor, numeral 101 denotes a memory for storing program, speeds and frame data, numeral 102 denotes a motor control circuit, and numeral 103 denotes a motor for driving a capstan roller 18. The controller 100 receives signals from the drive direction change-over circuit 47, comparator 43 and mark interval measuring circuit 63 and controls the drive of the motor 103 through the motor control circuit 102. The memory 101 comprises a ROM in which motor control program and speed change data are stored.

Figure 11:
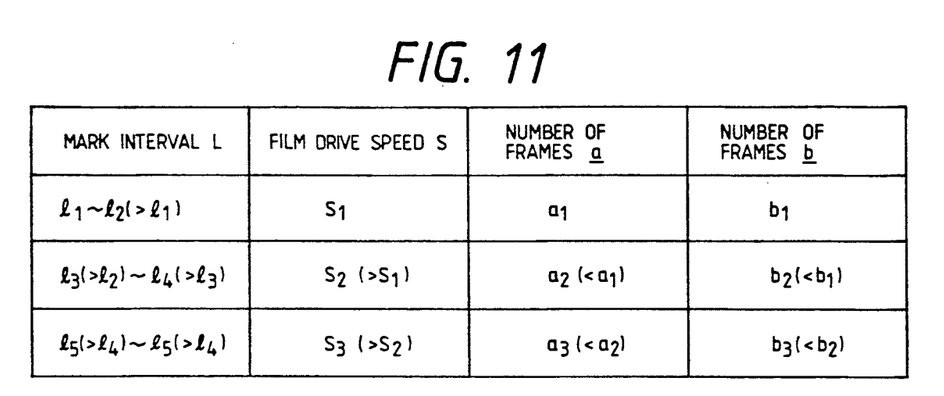
FIG. 11 illustrates data in a memory.

FIG. 11 shows the speed change data stored in the memory 101. It includes the film drive speed S and the numbers of frames a and b for the speed change, for the high speed mode corresponding to the mark interval L. In the present embodiment, films having three or more different mark intervals can be used, and a desired frame can be retrieved in a minimum retrieval time for each film. In the present embodiment, if the mark interval L measured by the mark interval measuring circuit 63 is between $l_1$ and $l_2$, the controller 100 reads the speed data $S_1$ and the numbers of frames $a_1$ and $b_1$ from the memory 101, transfers those data to the motor control circuit 102, sets the film drive speed in the high speed mode to $S_1$, sets the number of frames for medium speed to $b_1$, and sets the number of frames for the low speed to $a_1$. As a result, the film is driven at the speed $S_1$ at the start of retrieval, the speed is changed to the medium speed when the number of frames reaches $b_1$, and changed to the low speed when the number of frames reaches $a_1$. When the measured mark interval is between $l_5$ and $l_6$, the drive speed in the high speed mode is set to $S_3$ and the number of frames are set to $a_3$ and $b_4$, respectively.

In accordance with the present invention, the drive speed of the information recording medium is changed in accordance with the mark interval. As a result, the information recording medium can be driven at a maximum speed which permits the retrieval, and the retrieval time is shortened for each information recording medium. Thus, the retrieval may be effected efficiently.

I claim:

1. An information retrieval apparatus in which marks provided on an information recording medium are detected and desired information on the medium is detected by counting the detected marks, said apparatus comprising:
    drive means for driving the information recording medium;
    measuring means for measuring an interval of neighboring marks arranged on the information recording medium to determine an interval between successive marks; and
    speed control means for controlling a maximum drive speed of the information recording medium driven by said drive means in accordance with the determined interval between successive marks.

2. An information retrieval apparatus according to claim 1, wherein said speed control means determines that the maximum drive speed is high when the mark interval measured by said measuring means is large.

3. An information retrieval apparatus according to claim 1, wherein said speed control means varies timing signals to said drive means in accordance with the mark interval to decrease the drive speed of the information recording medium.

4. An information retrieval apparatus according to claim 1, wherein said measuring means includes signal generating means for generating a signal every time the information recording medium is driven a predetermined length, mark detection means for detecting the marks, and means for counting ht signals generated by the mark detection means and calculating the interval of marks.

5. An information retrieval apparatus according to claim 1 further comprising count means for counting the marks of the information recording medium and compare means for comparing the count of said count means with an address of information to be retrieved and stopping the information recording medium based on the comparison.

6. An information retrieval apparatus according to claim 5 wherein said drive control means controls the drive speed of the information recording medium in accordance with the outputs of said measuring means and said compare means.

7. An information retrieval apparatus according to claim 5 wherein said drive control means includes means for changing the drive speed when a difference between the count of said count means and the address of the information to be retrieved reaches a predetermined value, and means for setting said predetermined value in accordance with the mark interval.

8. An information retrieval apparatus according to claim 5, wherein said speed control means sets the information recording medium at the maximum drive speed until a difference between the count of said count means and the address of information to be retrieved is equal to a predetermined value.

9. An information retrieval apparatus according to claim 8, wherein said speed control means sets the information recording medium at a higher speed when the interval of marks is large and at a lower speed when the interval of marks is small.

10. An information retrieval apparatus according to claim 1, wherein said measuring means includes detecting means for detecting the marks, a timer for measuring a time period for the marks on the information recording medium based on the output from said detecting means and means for calculating the mark interval based on the time period measured by said timer and the drive speed of the information recording medium.

11. A film projector comprising:
    drive means for driving a film having a mark put thereon for each of a plurality of images recorded on the film.
    mark detection means for detecting the marks on the film;
    stop means for stopping the film at a predetermined position in accordance with the mark detected by said mark detection means;
    optical means for projecting the image of the film positioned at said predetermined position;
    measuring means for measuring an interval of neighboring marks on the film to determine an interval between successive marks; and
    speed control means for controlling a maximum drive speed of the film driven by said drive means in accordance with the determined interval between successive marks.

12. A film projector according to claim 11, wherein said speed control means determines that the maximum drive speed is high when the interval of the marks measured by said measuring means is large.

13. A film projector according to claim 11, wherein said speed control means varies timing signals to said drive means in accordance with the mark interval to decrease the drive speed of the film.

14. A film projector according to claim 11, wherein said measuring means includes means for calculating the mark interval based on the signal produced by said mark detection means.

15. An image retrieval apparatus which retrieves a desired image of an image recording medium having a plurality of images and image retrieving marks provided thereon corresponding to the respective images, said apparatus comprising:
   means for moving the image recording medium along a predetermined passage;
   detecting means disposed along the passage for detecting the marks;
   measuring means for measuring an interval of neighboring marks to determine an interval between successive marks;

16. An image retrieval apparatus according to claim 15, wherein said speed control means set the maximum drive speed high when the interval of the marks measured by said measuring means is large.

17. An image retrieval apparatus which retrieves a desired image of an image recording medium having a plurality of images and image retrieving marks provided thereon corresponding to the respective images, said apparatus comprising:
   moving means for moving the image recording medium along a predetermined passage;
   detecting means disposed along the passage for detecting the marks;
   measuring means for measuring an interval of neighboring marks to determine an interval between successive marks; and
   control means for stopping the image recording medium based on the mark detected by said detecting means, said control means varying timing signals to said moving means on the basis of the determined interval between successive marks.

* * * * *

UNITED STATES PATENT AND TRADEMARK OFFICE
CERTIFICATE OF CORRECTION

PATENT NO. : 5,146,247
DATED : September 8, 1992
INVENTOR(S) : KAZUO KASHIWAGI

Page 1 of 2

It is certified that error appears in the above-identified patent and that said Letters Patent is hereby corrected as shown below:

COLUMN 10

Line 6, "ht" should read --the--.
Line 10, "claim 1" should read --claim 1,--.
Line 17, "claim 5" should read --claim 5,--.
Line 22, "claim 5" should read --claim 5,--.

COLUMN 11

Line 22, "marks;" should read
--marks;
¶ stop control means for controlling said moving means to stop the movement of the image recording medium on the basis of a mark detected by said detecting means; and
¶ speed control means for controlling a maximum moving speed of the image recording medium moved by said moving means based on the determined interval between successive marks.--.

COLUMN 1

Line 41, "in" should read --is--.

COLUMN 5

Line 50, "signal" should read --signal.--.
Line 60, "signal" should read --signal.--.
Line 66, "backward" should read --backward.--.

UNITED STATES PATENT AND TRADEMARK OFFICE
CERTIFICATE OF CORRECTION

PATENT NO. : 5,146,247
DATED : September 8, 1992
INVENTOR(S) : KAZUO KASHIWAGI

Page 2 of 2

It is certified that error appears in the above-identified patent and that said Letters Patent is hereby corrected as shown below:

COLUMN 6

Line 48, "V (>1)" should read --B(>1)--.
  Line 58, "42" should read --42.--.

COLUMN 9

Line 34, "$b_4$" should read --$b_3$--.

Signed and Sealed this

Twelfth Day of October, 1993

BRUCE LEHMAN

Attesting Officer    Commissioner of Patents and Trademarks